Sept. 5, 1961     K. RINDERLE     2,998,963
MACHINE FOR STIRRING, BEATING AND MIXING SOLID SUBSTANCES
Filed June 26, 1959     5 Sheets-Sheet 1

INVENTOR
KARL RINDERLE,
by John B. Brady
ATTORNEY

Sept. 5, 1961 K. RINDERLE 2,998,963
MACHINE FOR STIRRING, BEATING AND MIXING SOLID SUBSTANCES
Filed June 26, 1959 5 Sheets-Sheet 3

INVENTOR
KARL RINDERLE,
by John B. Brady
ATTORNEY

Sept. 5, 1961　　　　K. RINDERLE　　　　2,998,963
MACHINE FOR STIRRING, BEATING AND MIXING SOLID SUBSTANCES
Filed June 26, 1959　　　　　　　　　　　　5 Sheets-Sheet 4

INVENTOR
KARL RINDERLE,
By John B. Brady
ATTORNEY

Sept. 5, 1961  K. RINDERLE  2,998,963
MACHINE FOR STIRRING, BEATING AND MIXING SOLID SUBSTANCES
Filed June 26, 1959  5 Sheets-Sheet 5

INVENTOR.
KARL RINDERLE
BY
*B. P. Fishburne, Jr.*
ATTORNEY

United States Patent Office 2,998,963
Patented Sept. 5, 1961

2,998,963
MACHINE FOR STIRRING, BEATING AND MIXING SOLID SUBSTANCES
Karl Rinderle, 56 Hauptstrasse, Staufen, Breisgau, Germany
Filed June 26, 1959, Ser. No. 823,175
Claims priority, application Germany July 18, 1958
4 Claims. (Cl. 259—9)

This invention provides a machine for stirring, beating and mixing pastes, doughs and solid substances with liquid as well as for piping or extruding, shaping, decorating or dividing the same.

With the machine of the present invention mixes of various consistency can be stirred, beaten, blended and, after finishing, selectively either extruded (piped) pneumatically or hydraulically by means of a plunger, or expressed, shaped, decorated or divided, the resulting products being at least equal in quality to those hitherto produced, while at the same time a considerable saving in time is attained.

Accordingly, an object of the invention is to provide a machine for stirring, beating and mixing various substances and for subsequently automatically discharging the mixed substances from the mixing chamber to and through extruding nozzle means and into suitable receptacles.

A further object is to provide in a machine of the mentioned character novel means adapted to serve the dual purpose of mixing substances in a fixed mixing chamber and subsequently discharging the substances therefrom under pressure.

Another object is to provide a machine of the above mentioned character including novel mounting means for the mixing and discharging components and the lids of the fixed mixing chambers, whereby these elements are adapted for separation from the mixing chambers and shiftable to one side thereof to facilitate emptying and cleaning of the mixing chamber.

Other objects and advantages of the invention will be apparent during the course of the following description:

The accompanying drawings depict an exemplary embodiment of the invention.

Figure 1:
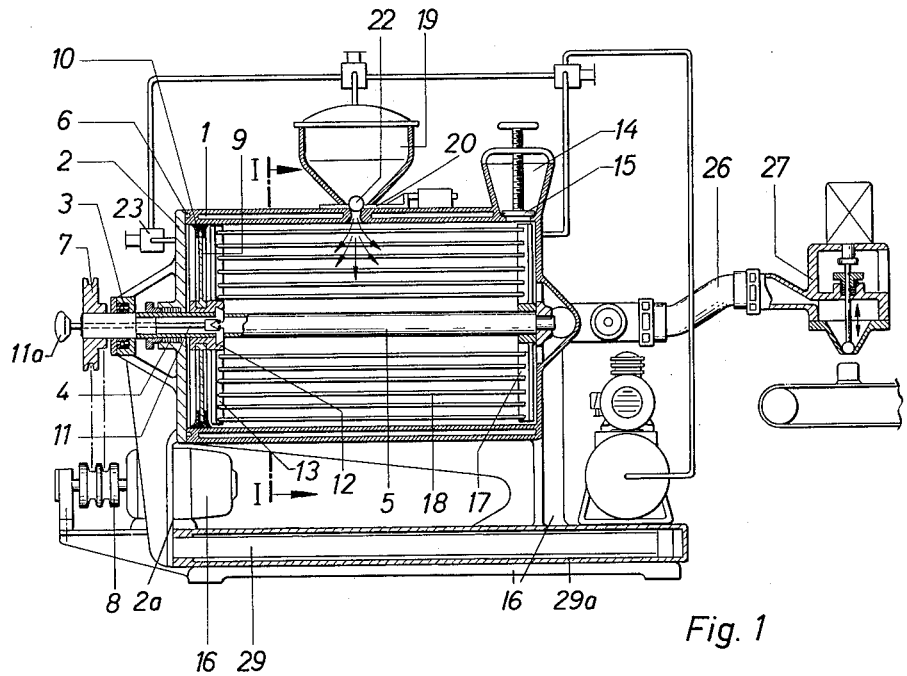
Figure 2:
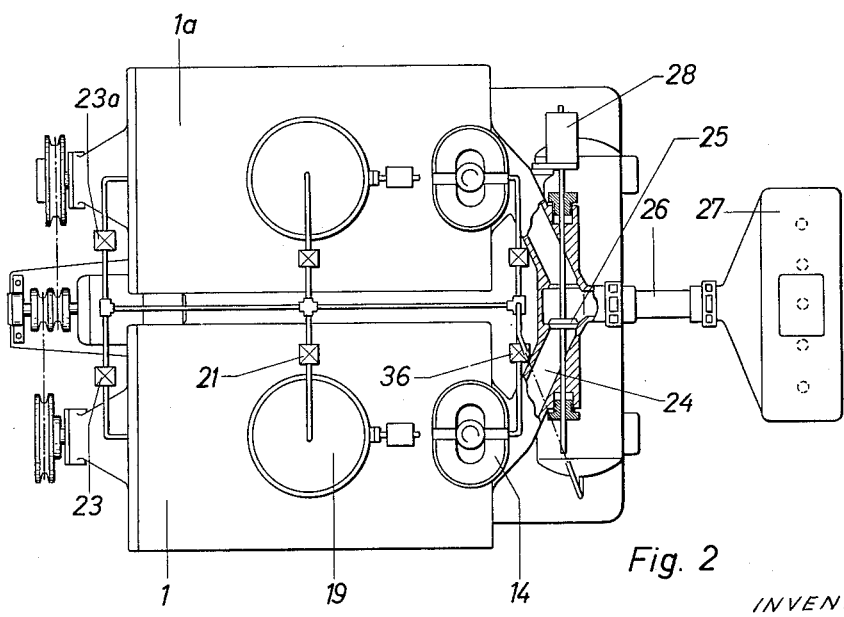
Figure 3:
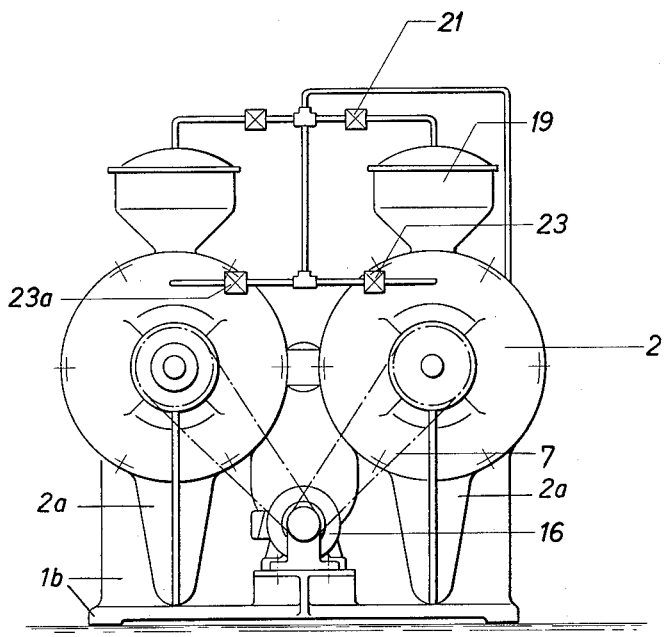
Figure 4:
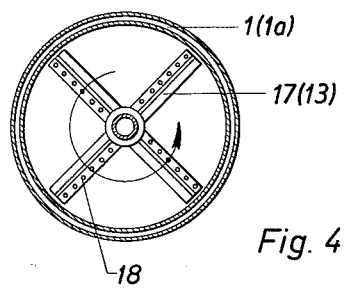
Figure 5:
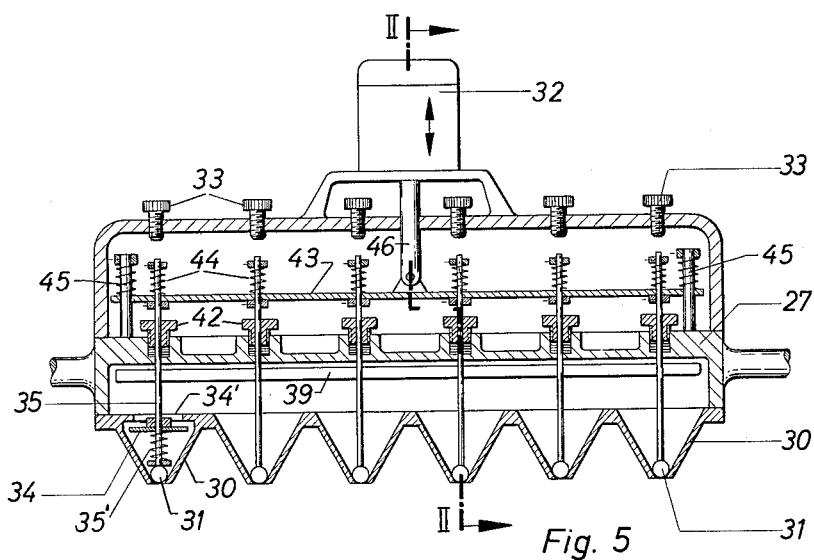
Figure 6:
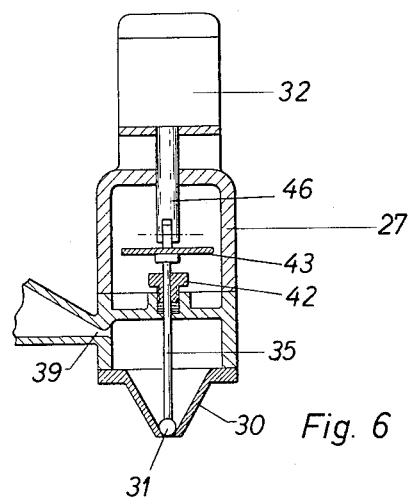
Figure 7:
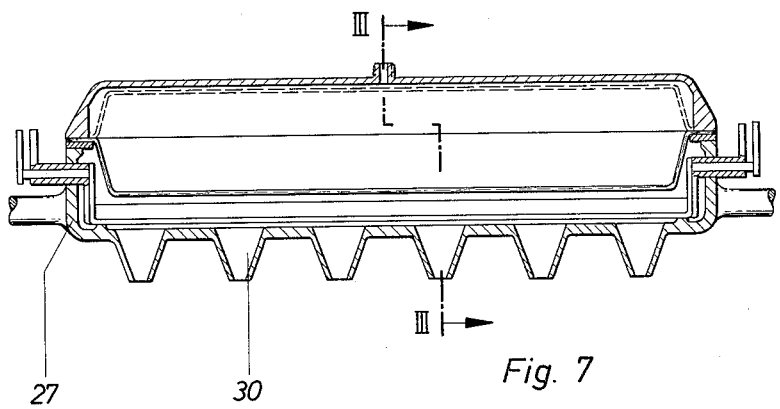
Figure 8:
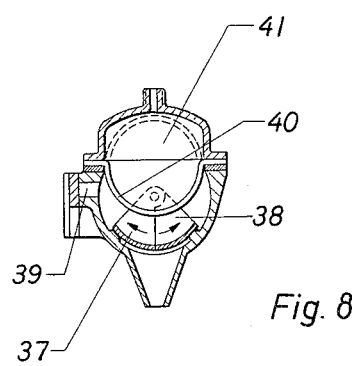
Figure 9:
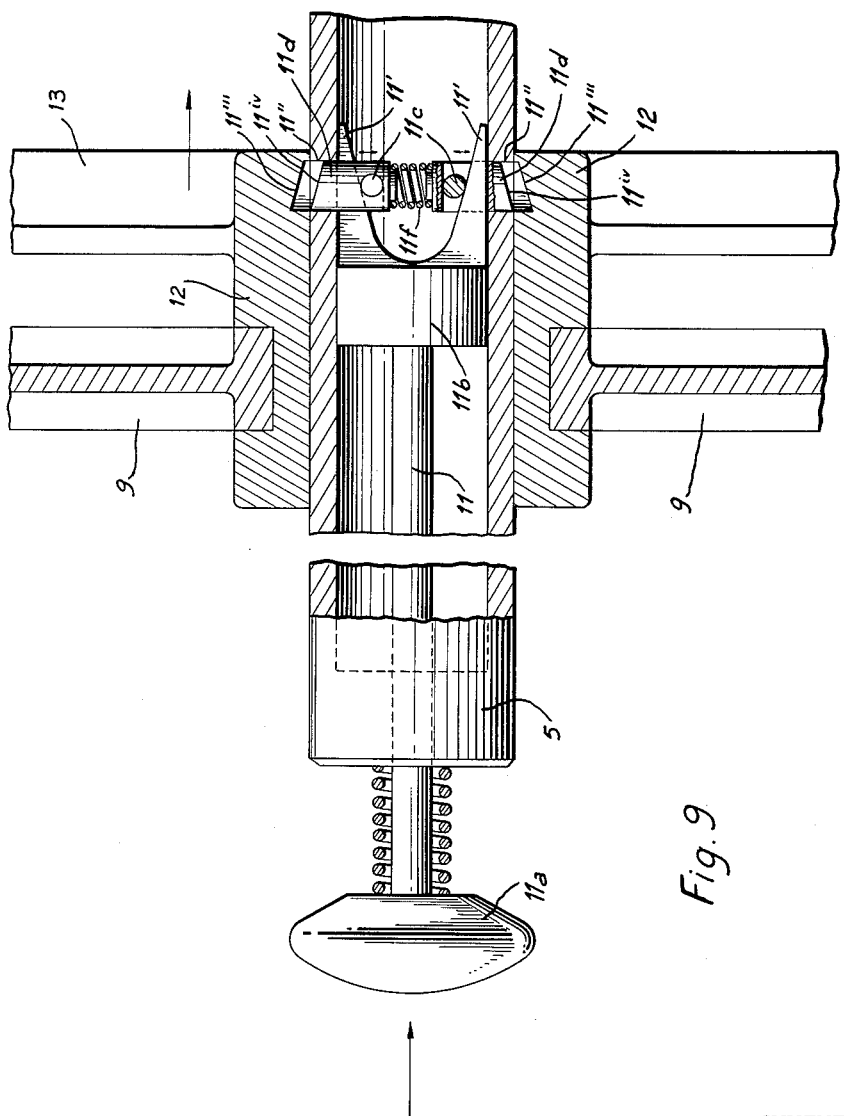

FIG. 1 is a side elevation.
FIG. 2 is a plan view.
FIG. 3 is a front elevation.
FIG. 4 is a front sectional elevation.
FIG. 5 is a longitudinal section through the piping device.
FIG. 6 is a cross-section through the piping device.
FIG. 7 is a longitudinal section through another form of piping device.
FIG. 8 is a cross-section through this last mentioned device.
FIG. 9 is an enlarged fragmentary longitudinal sectional view of the plunger clutch and associated elements shown in FIG. 1.

The illustrated machine comprises airtight-sealed, cylindrical mixing containers or bowls 1, 1a, jacketed for alternative heating or cooling each with a retractable closure lid 2 in which are concentrically arranged a bearing 3 and a stuffing box 4 for a mixer shaft 5 as well as a gasket ring 6. The containers or bowls 1 and 1a are formed rigid with a unitary support or base 1b, as shown. Each closure lid 2 and associated elements is rigidly mounted upon a vertical arm or bracket 2a extending near the bottom of the support 1b, and rigidly secured to a rock shaft 29 rotatably and longitudinally movable within a horizontal sleeve 29a formed integral with the support 1B. The arrangement is such that each lid 2 and the parts associated therewith within the mixing container may be retracted away from the open end of the container and shifted toward the outer side of the machine by rocking upon the axis of the rock shaft 29 to provide clear access to the interior of the mixing chamber for cleaning, etc. The mixer shaft 5 is driven alternatively, directly by a flange coupled motor, or by a belt pulley 7 working through a magnetic clutch 8 driven by motor 16, rigidly mounted upon the support 1b between and below the mixing containers 1 and 1a. Immediately behind the closure lid 2 the mixer shaft 5 carries a plunger 9 seating on a bush 12 with a double cup-leather 10. The plunger 9 is held in its end position by a penumatically-actuated or manually actuated clutch 11 and the bush 12.

The clutch 11 comprises a plunger rod 11a having a head 11b which operates slidably within the bore of the mixer shaft 5. The head 11b carries tapered clutch actuating elements 11′, slidably engaging lateral pins 11c of radially shiftable clutch dogs 11d, engageable through radial openings 11″ formed through the side wall of the mixer shaft 5. Cooperating recesses 11‴ in the bore of the bush 12 are adapted to register with the openings 11″ and receive the clutch dogs 11d when the latter are urged outwardly as by resilient means 11f. The tapered actuating elements 11′ serve to retract the clutch dogs 11d from the recesses 11‴ when the rod 11a is shifted axially inwardly, manually or by pneumatic means, not shown. The outer ends 11iv of the clutch dogs are beveled, as shown in FIG. 9 to permit passage of the outer end of the bush 12 over the clutch dogs when the bush and the plunger 9 are shifted to the outer end of their travel, adjacent the lid 2 for locking the element with the mixer shaft 5. When it is desired to unlock the bush 12 and associated elements for movement away from the lid 2, it is merely necessary for the operator to push the rod 11a inwardly and the actuator elements 11′ will then retract the clutch dogs 11d from the recesses 11‴.

The bush 12 is connected with a mixer-implement carrier or implement members 13 of any suitable kind. A funnel-shaped feed hopper 14 on the mixing bowl 1 with a cover and quick closure 15 is used for introducing the liquid or solid material(s) to be stirred, beaten or mixed.

Upon starting the motor 16, the mixer shaft 5 with a mixer-implement carrier or implement members 17 are brought into rotation through the intermediary of the clutch 11 and the mixer-implement carrier 13 whereupon mixing implements 18 stretched between the mixer-implement carriers 13 and 17 beat, mix or stir the introduced material. The valves 20 and 21 of one or more feeders 19 can be opened periodically by an automatic timer not shown or by hand, whereupon additional material contained in the feeder 19 can be discharged into the mixing bowl by means of compressed air, controlled by the magnetic valve 21. After emptying the feeder 19, a float valve 22 closes the outlet from the feeder to the mixing bowl 1 and cuts off the compressed air supply. On completion of the beating, stirring or mixing process, the automatic timer stops the motor 16 and opens the magnetic valves 23 and 25. The clutch 11 is released manually or by pneumatic means, as stated, whereupon compressed air entering between the lid 2 and plunger 9 as controlled by valve 23, or 23a, causes the plunger 9 to move axially away from the lid 2 and along the mixer shaft 5 for pressing the mix, contained in the mixing bowl 1 or 1a, through a connecting pipe 24, the valve 25 and a discharge pipe 26 into the piping, dividing or shaping device 27. In view of the withdrawal of material by the shaping device 27, the plunger 9 with the mixer implement holder 13 travels along the mixer shaft 5 as far as the mixer-implement carrier 17, the working pressure used being adjustable at will by a pressure-reducing valve, not shown.

After the mixing bowl 1 is emptied, the valve 25 is changed over, either by an electromagnet or by a pressure cylinder 28 with simultaneous opening of the magnetic valve 25 connecting the second mixing bowl 1a with the discharge pipe 26 so that continuous piping, extrusion or division in dosed quantities is possible by means of closures 31, FIG. 5, the shape of which is adapted to the shape of the piping nozzles or extrusion patterns 30. The mix is introduced into the shaping device 27 through feed aperture 39, from thence into piping nozzles 30 and then discharged therefrom through closures 31. Nozzle closures 31 are controlled by movable valve spindles 35 which extend through bushings 42 and have their opposite ends yieldably connected to control plate 43 through spring members 44. Control plate 43 is disposed for vertical guided movement on guide members 45 and vertical actuation motion to open and close the nozzle closures 31 is imparted thereto through linkage 46 by a selectively operable electromagnet or compressed air cylinder designated at 32. The degree to which the closures 31 of nozzles 30 are opened is thus controlled by the selective operation of the electromagnet or air cylinder 32, and the degree of closure opening and program of closure opening and closing controls whether continuous or dosed quantities of the piping or extrusion are produced.

The shaping device 27 is provided with adjustable setting screws 33 disposed in alignment with the ends of the valve spindles 35 as shown and disposed to contact the ends thereof when they are in the raised position. The adjustment of the setting screws 33 thus controls the maximum opening of the closures 31 and thus governs the quantity of material passing through the piping nozzles 30. It should be noted that a different opening can be set for each piping nozzle if it is so desired.

By fitting a valve head 34 on the valve spindle 35 to coact with the port 34', each time the closures 31 of the piping nozzles 30 are opened by the movement of the valve spindles 35 the ports 34' are closed by valve heads 34; thus with this arrangement it is possible to draw off exactly dosed quantities, even of a thin liquid mix. A single dosed quantity would thus consist of the amount of mix which would flow into nozzle 30 through port 34' while the latter is in the open position and closure 31 is in the closed position. The valve head 34 is yieldably spring-loaded to valve spindle 35 by spring 35' to assure positive seating of the valve head over the port 34' as the spindle is moved in an upwardly direction.

The mixing bowl 1, cut off by the valve 25 from the discharge pipe 26, can be brought back into initial position by admitting air through the magnetic valve 36, the plunger 9 with the mixer-implement holder 13 then running back to the stop or locking clutch dogs 11d on the clutch 11 and resetting the mixing implements 18 which have been pushed forward during the emptying operation.

In the shaping device 27 any desired number of variously shaped piping nozzles or extrusion patterns 30 can be inserted.

FIGS. 7 and 8 represent a shaping or moulding arrangement with piping nozzles or extrusion patterns 30 interchangeable at will and opened or closed by the sleeve valves 37 and 38 adapted to the shape of the casing. A membrane 40 fitted above the feed aperture 39 by introducing compressed air or another pressure fluid into the pressure chamber 41 enables the piping pressure to be increased or, when the shaping or moulding device 27 is to be detached from the discharge pipe 26 during the piping operation, the production of the then necessary working pressure.

What I claim is:
1. A mixing and dispensing machine comprising a stationary mixing bowl, a shaft journaled within the mixing bowl for rotation, means to rotate said shaft, a first implement carrier fixedly secured to said shaft near one end of the mixing bowl and rotatable with the shaft, a second implement carrier movably mounted upon said shaft in spaced relation to the first named implement carrier, releasable clutch means interconnecting the second implement carrier and shaft so that the second implement carrier may turn with the shaft or be released therefrom, a plunger slidable upon said shaft outwardly of the second implement carrier, means to introduce compressed air into the mixing bowl between the plunger and one end of the bowl to thereby shift the plunger and second implement carrier axially of the shaft toward the first named implement carrier, said plunger having an interlocking part engageable with said clutch to releasably lock the plunger to the shaft, and flexible mixing elements connected with the first and second implement carriers and extending between the same for rotation therewith when the plunger and second implement carrier are locked to the shaft by said clutch.

2. A mixing and dispensing machine comprising a stationary mixing cylinder having a horizontal axis, a lid covering one end of the mixing cylinder, a fixed support carrying said mixing cylinder and having a horizontal sleeve below the mixing cylinder, a member carrying said lid and depending therefrom, a horizontal rock shaft secured to said member and engaging rotatably and slidably within said sleeve, whereby said lid may be shifted axially from said one end of the cylinder and swung to one side of the cylinder upon the axis of the rock shaft, a mixer shaft journaled upon said lid and cylinder for rotation, means to rotate said mixer shaft, a plunger assembly slidably mounted upon said mixer shaft, clutch means associated with the mixer shaft and plunger assembly to releasably lock the plunger assembly to the mixer shaft, flexible mixing elements connected with the plunger assembly and said shaft and extending longitudinally within said cylinder, means to introduce compressed air into the cylinder between the plunger assembly and said lid when the clutch means is inactive to thereby shift the plunger assembly axially along the mixer shaft and away from said lid and toward the other end of said cylinder, and discharge means connected with said cylinder near said other end.

3. A mixing and dispensing machine comprising a stationary base, a substantially horizontal mixing cylinder fixedly secured to said base and spaced above the bottom of the base, a lid covering one end of the mixing cylinder and movable relative thereto, a depending member secured to and carrying the lid, a horizontal rock shaft secured to the bottom of said member, a horizontal sleeve secured to said base near the bottom thereof and rotatably and slidably receiving said rock shaft, whereby said lid may be retracted from covering engagement with said one end of the mixing cylinder and swung to one side of the cylinder to permit ready access to the interior of the cylinder, a substantially horizontal mixer shaft extending longitudinally within the mixing cylinder centrally thereof and having one end journaled upon the mixing cylinder and another end journaled upon said lid, means mounted upon said base and connected with the mixer shaft to rotate the same, a bush mounted upon the mixer shaft and movable axially thereon and adapted to rotate therewith when locked thereto, a plunger rigidly secured to said bush and having peripheral sealing engagement with the bore of the mixing cylinder, implement members secured to said bush and movable therewith, second implement members secured to said mixer shaft near its end remote from said lid and movable with the mixer shaft, flexible mixing elements interconnecting the first-named and second implement members and extending lengthwise of the mixing cylinder and spaced radially of the mixer shaft and parallel therewith, discharge conduit means connected with the mixing cylinder near its end remote from said lid, releasable clutch means interconnecting said bush and mixer shaft so that the same may rotate as a unit when the clutch means is active and permitting the bush to move independently of the mixer shaft lengthwise thereof when the clutch means is inactive, and means for introducing compressed air between said lid and said plunger within said mixing cylinder while said clutch means is inactive, whereby said bush, plunger and first-named implement members may be forced pneumatically toward said second implement members and said discharge conduit means.

4. A mixing and dispensing machine as set forth in claim 3, including means for introducing compressed air adjacent said second implement member and said discharge conduit means, for pneumatically returning said bush, plunger and first-named implement member toward said lid.

References Cited in the file of this patent
UNITED STATES PATENTS
2,415,711     Sticelber _____ Feb. 11, 1947